Patented June 16, 1953

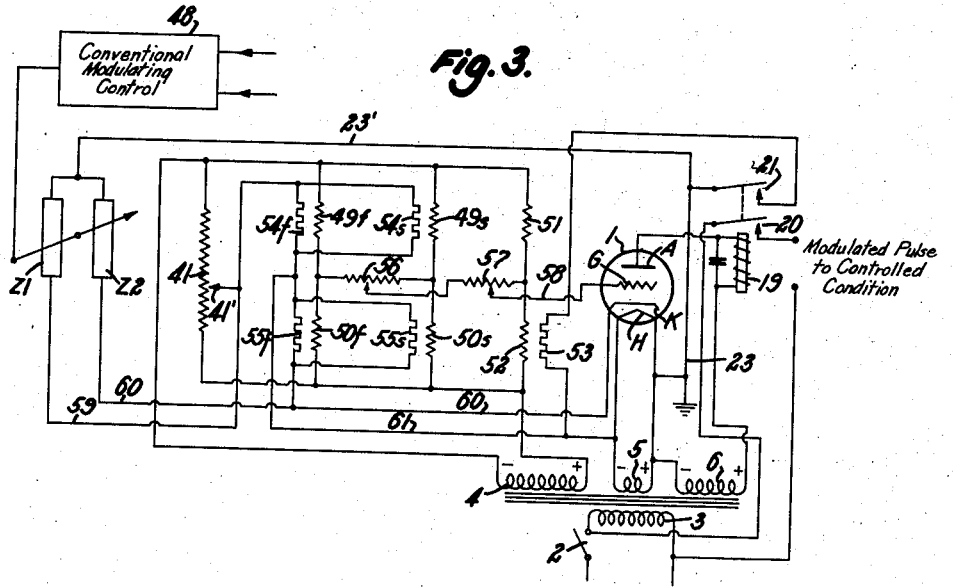
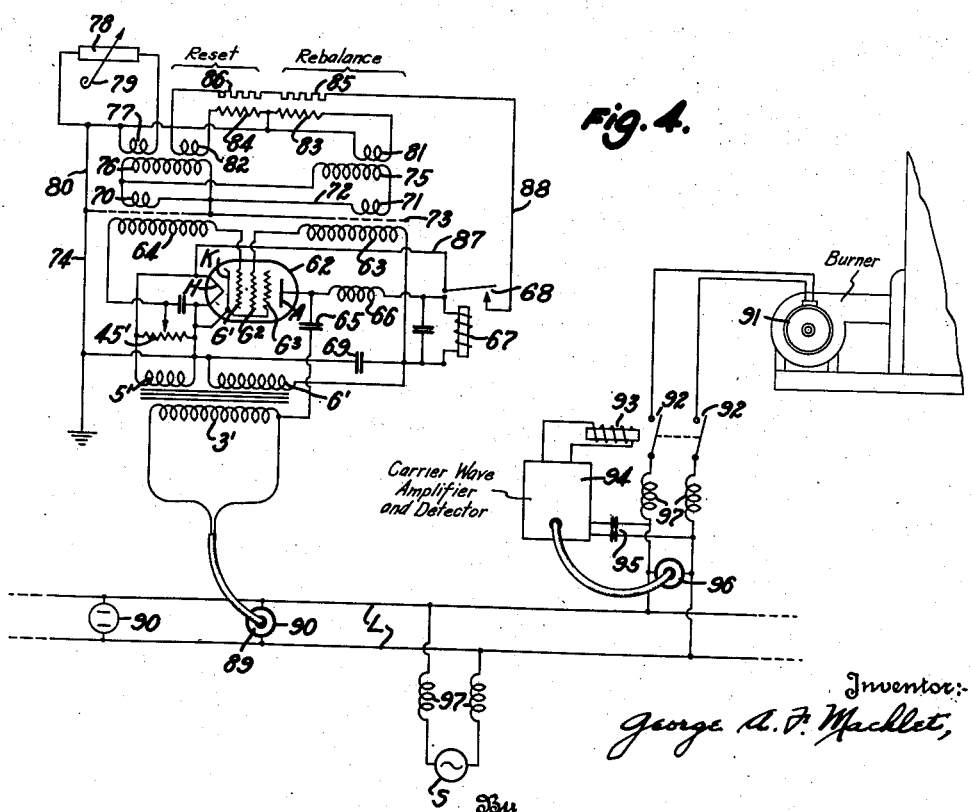

2,642,228

UNITED STATES PATENT OFFICE 2,642,228

PULSING ELECTRONIC MEASURING AND CONTROL APPARATUS

George A. F. Machlet, Elizabeth, N. J.

Application December 30, 1947, Serial No. 794,462

18 Claims. (Cl. 236—68)

This invention relates to electronic measuring and control apparatus, and more particularly to electronic apparatus of high sensitivity which responds to variations in a control factor, such as temperature, pressure, direction, current, voltage or the like, to register or record the changes in the magnitude of the factor and/or to energize a control system in accordance with the change in the control factor.

Electronic apparatus of this general type is frequently employed to regulate the supply of fuel to a burner to maintain a desired temperature within an oven or furnace, and some of the prior equipment has provided a "proportioning control," i. e. a modulation of the fuel supply is proportion to the departure of the oven or furnace temperature from the preselected control value. Some of the prior proportionting control systems included an electronic circuit which was unbalanced to a greater or less extent according to the departure of the oven or furnace temperature from its preselected value, a reversing motor energized by an unbalance of the electronic circuit to actuate a modulating fuel valve, and a return or rebalancing circuit including an impedance variable with the adjustment of the fuel valve and serving to rebalance the electronic circuit upon adjustment of the fuel valve by an increment proportional to the temperature change which produced the unbalance of the electronic circuit. Electronic measuring and control circuits of this type are described and claimed in my prior Patent No. 2,414,314, now reissued under No. 23,160, and in my copending application Ser. No. 499,557, filed August 21, 1943, which matured as Patent No. 2,434,941 on January 27, 1948.

The present invention relates to proportioning control circuits in which the controlled device, which may be a fuel valve or other regulating apparatus according to the particular application of the invention, is not progressively adjusted but is shifted from one end position to the other by modulated current pulses which vary as to duration and/or frequency with the magnitude of the departure of the measured control factor from its desired value. One embodiment of a control system of the modulated current pulse type is illustrated in Fig. 9 of my copending application, and is specially claimed therein.

A dominant advantage of the modulated current pulse type of proportioning control is the elimination of the rebalancing circuit previously connected from the controlled device back to the electronic circuit. Electric furnaces of the resistance heater type and much fuel-fired equipment may also be advantageously controlled by a modulated current pulse system. The modulated current pulse system of control is also of advantage when the controlled condition or process is subject to considerable inertia which would require, in the prior control systems, complex and/or expensive arrangements to eliminate hunting.

Objects of the present invention are to provide electronic measuring and proportioning control apparatus in which the measuring or control device is energized by current pulses. Objects are to provide electronic control apparatus which afford a proportioning control but which do not require a rebalancing circuit connection from the controlled device to the electronic control circuits. Other and more specific objects of the invention are to provide electronic control systems in which a normally balanced input circuit network for an electronic tube is unbalanced by a departure of a control factor from a preselected value, current pulses which vary in duration or frequency with the extent of the unbalance are transmitted to a controlled device, and the input circuit network is rebalanced by an impedance which varies in magnitude with the time-integrated average value of the current pulses.

These and other objects and advantages of the invention will be apparent from the following specification when taken with the accompanying drawings in which:

Fig. 3 is a circuit diagram of a further embodiment which, in association with a prior proportioning control system, provides a proportioning control of energization of the ultimate control device by current pulses; and Fig. 4 is a circuit diagram of a further embodiment of the invention as incorporated in a home-heating furnace assembly.

Figure 1:
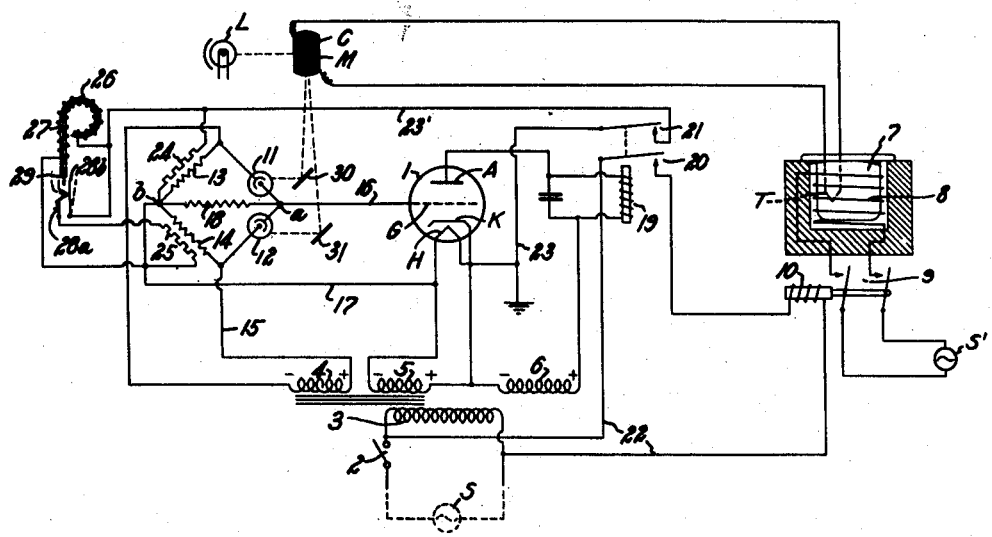
Fig. 1 is a circuit diagram of an embodiment of the invention in which the control factor operates through a photoelectric system to control the electrical heating of a crucible.

In the control apparatus of Fig. 1, an electronic tube 1 is energized in conventional manner from an alternating current source S upon the closing of a switch 2 in a lead to the primary winding 3 of a power transformer having a plurality of secondary windings 4, 5 and 6 for developing, respectively, a grid bias voltage, a cathode heater voltage, and a plate circuit voltage. This tube 1 is shown as a triode having a control grid G, a plate or anode A, and a uniform potential cathode K with a heater H, but other types of amplifier tubes may be used. The controlled apparatus is a crucible 7 which is heated by a resistance winding 8 when switch 9 is closed by solenoid 10 to connect the winding to a source S' which may be the same as or different from the current source S which energizes the tube 1.

The input circuit network of the tube 1 is a Wheatstone bridge having photocells 11, 12 as two adjacent arms and resistances 13, 14 as the other two adjacent arms. The secondary winding 4 of the power transformer is connected across the bridge by leads 15 which extend respectively to the junctions of photocell 11 and resistance 13, and of photocell 12 and resistance 14. The bridge terminal $a$ common to the photocells 11, 12 is connected to the control grid G by a lead 16, and the opposite bridge terminal $b$ is connected by lead 17 to that terminal of the winding 5 which is at a negative potential during those half-cycles when the plate potential is positive. A resistance 18 extends between the bridge terminals $a$ and $b$ to bias the grid G negatively, by the voltage drop across the cathode heater H, during periods when the bridge network is balanced. This initial bias on grid G is such that the resulting or normal plate current is slightly less than the pull-in current value of relay 19 and is slightly greater than the drop-out current value, and it may be approximately one-half the maximum plate current for the applied plate voltage. In other words, the operating point of the relay 19 is located approximately at the center of the grid voltage-plate current characteristic of the tube 1.

The plate circuit of tube 1 includes a relay 19 having two sets of normally open contacts 20, 21; the contacts 20 being connected in series with the current source S and the operating coil 10 of switch 9 by leads 22, 22. The movable element of relay contacts 21 is connected by lead 23 to the ground side of the cathode heater secondary 5, and the cooperating movable blade contact is connected through lead 23, heater resistors 24, 25 and 26 in parallel, and lead 17 to the other side of the secondary winding. Resistors 24, 25 are in heat transfer relation to the bridge resistances 13, 14 respectively, and the latter have positive temperature-resistance characteristics. The plate current increases upon an unbalance of the bridge which carries the grid G less negative, and the relay 19 pulls in at a preselected grid bias, thereby energizing solenoid 10 to close the power switch 9 to the crucible heater winding 8, and simultaneously supplying current to heaters 24, 26 over relay contacts 21. The heater resistor 26 is the winding on a bimetallic strip 27 of a thermal switch having resilient blade contacts 28$a$, 28$b$ in series with the heater 25 of the bridge arm 14. The free end of the bimetallic strip has fixed thereto a tip 29 of insulating material which extends between the ends of the switch blades 28$a$, 28$b$ and floats freely between the switch blades when pulses of heating current are supplied to the heater 26 during the normal operation of the control apparatus. In each of its end positions, i. e. when at room temperature or when heated to saturation, the tip 29 of the bimetallic strip engages one of the blades to open the switch, thereby interrupting current to the heater 25. The heat capacity of the thermal switch is so great that the bimetallic strip 27, when heated, can open the contacts 28$a$, 28$b$ only when heated continuously for a long period, for example during the heating up of a furnace, or after the introduction of a substantial mass of cold material into a crucible. The reason for rendering the heater 25 inoperative under such conditions will be apparent from the following description.

The resistances 13 and 14 are the "rebalancing arm" and the "resetting arm," respectively, of the bridge network of the control system, and the effective resistance values of these arms vary differentially to regulate the average power input to resistance winding 8 to maintain the temperature of the crucible 7 at a desired level. The rebalancing resistance 13 and its heater 24 have a lower heat inertia than the resetting resistance 14 and its heater 25, and the resistance 13 therefore varies more rapidly as to temperature and resistance than does the resistance 14 when time-modulated current pulses are supplied to their respective heaters by the closing and opening of the relay contacts 21. At saturation, i. e. when the heaters 24, 25 receive current for an extended period, the bridge resistances 13, 14 are heated to the same maximum temperature and therefore have the same maximum resistance when, as is convenient and preferable, the resistances 13, 14 are of the same magnitude at any given temperature. Each bridge resistance 13, 14 may be of nickel wire on a ceramic tube, and the heaters 24, 25 may be wound on smaller diameter ceramic tubes which are then secured within the tubes of resistances 13, 14 respectively. The heat inertia of each assembly may be adjusted to a desired value by fitting an iron core within the inner ceramic tube. The resistance assemblies should be so mounted in the control apparatus as to have equal losses through radiation.

Inspection of the bridge network shows that current supplied to the bridge by the secondary winding 4 has no effect upon the bias voltage impressed upon grid G of tube 1 so long as the bridge is balanced, i. e. so long as no current from winding 4 flows along resistance 18 to establish a potential drop in the grid-cathode circuit comprising lead 16, resistance 18 and lead 17. Furthermore, it is apparent that increases (or decreases) in the effective magnitudes of the resistances 13 and 14 tend to unbalance the bridge network in opposite sense. Assuming instantaneous polarities for windings 4, 5 and 6 as indicated by plus and minus symbols applied thereto, and remembering that the tube 1 can conduct only when the plate potential is positive, the bridge network will be unbalanced to make grid terminal $a$ more positive if the resistance of the arm comprising photocell 12 is reduced below the resistance of the adjacent arm comprising photocell 11. The bridge may be rebalanced by increasing the effective resistance of the opposite bridge arm, comprising resistance 13, and the degree of unbalance may be increased by raising the resistance of the bridge arm 14.

The thermal inertias introduced by the heating of the rebalancing and resetting arms of the bridge to alter their effective values will have absolute and relative magnitudes which depend upon the particular process or apparatus to be controlled. The time constant of the resetting element must be equal to or greater than the sum total of all time lags of the entire system if stability is to be obtained. The time constant of the rebalancing element will be substantially smaller as the rebalance upon a change in operating conditions must be effected before the network can be reset for an ultimate balance at the preselected control factor value. The requirements for rebalancing and resetting a control system are discussed in my prior Patent No. 2,414,314.

During normal operation, the initial balance condition of the bridge is determined by the selected control factor as it varies above and below a desired value. As illustrated in Fig. 1, this primary control is provided by a temperature-measuring system which selectively illuminates the photocells 11, 12 according to the crucible temperature. A thermocouple T within the crucible 7 is connected to the moving coil C of a sensitive measuring instrument, and a mirror M on the coil reflects a light beam from a light bulb L towards the mirrors 30, 31 from which the beam is reflected to photocells 11, 12 respectively. The relative illumination of the photocells depends upon the angular deflection of coil C, and the measuring and light systems are so adjusted by any convenient means, not shown, that both photocells are illuminated to the same degree when the crucible 7 is at the preselected temperature.

The bridge network is balanced at this condition if the bridge arms 13, 14 are at the same temperature, and the tube is biased only by the potential drop across the cathode heater H. The plate circuit relay 19 is therefore de-energized and its contacts 20, 21 are open to interrupt current to the operating coil 10 of the power switch 9 and to heaters 24, 25 of the control network. The control system is "fail-safe" in that power will not be supplied to the crucible heating winding 8 in the event of a failure of the light source, of the tube, or of other elements of the control system.

The measured temperature is far below the desired control value when the crucible is cold, and the closing of switch 2 to place the apparatus in operation is immediately followed by an unbalance of the bridge network as the light beam is reflected only to the photocell 12 to reduce its resistance. The potential at terminal $a$ of the bridge assumes a positive value, or at least a less negative value, by the unbalance of the bridge, and the plate current of tube 1 rises to a high value corresponding to the new grid bias value. The relay 19 pulls in to energize the operating coil 10 of the power switch 9, and also to supply current to the heater 24 of the bridge network and to the heater 26 of the thermal switch. The crucible heats up very slowly and will be far below the desired temperature when the rebalancing bridge arm 13 is heated to its maximum temperature by the heater 24. The increased resistance of the bridge arm 13 is too small to rebalance the bridge in view of the excessive unbalance due to the marked differential between the illumination of photocells 11 and 12 when the measured temperature is far below the desired value. The resetting bridge arm 14 is inoperative, for all practical purposes, during the heating up of the crucible since the circuit of its heater 25 is initially open at the thermal switch contacts 28a, 28b, and the transitory closing of the contacts 28a, 28b before the thermal switch is heated to saturation merely increases the unbalance of the bridge network at a time when it is already unbalanced by the differential illumination of photocells 11, 12 at the relatively low temperature of the crucible. The contacts 28a, 28b are again opened by the bimetallic strip 27 when heated to saturation, and the rebalancing arm 14 cools down to room temperature before the desired crucible temperature is reached. It is of course possible, with more elaborate thermal switches than that schematically shown in Fig. 1 to avoid this transitory heating of the resetting bridge arm 14 during the heating up operation.

The crucible temperature eventually approaches the desired value, and the instrument coil C moves clockwise from its previous end position to shift a portion of the light beam from the photocell 12 to the photocell 11. The bridge network is balanced when the measured temperature reaches the lower limit of the control range, i. e. before the photocells are equally illuminated, since the bridge arm 14 is cool but the rebalancing resistance arm 13 is heated to its maximum value. The plate current of tube 1 drops below the initial control point value at the rebalance of the bridge, and the plate circuit relay 19 drops out thereby to de-energize the operating coil 10 of power switch 9 and to open the circuit to heater 24 of bridge arm 13 and to heater 26 of the thermal switch. The crucible temperature continues to rise for some time after power is removed from the heating winding 8, since the mass of the crucible introduces a considerable time lag, but the heater 24 and the heater 26 of the thermal switch begin to cool down at once. The heat inertias or time constants of bridge arm 13 and thermal switch are so related to the time lag of the crucible that the bridge arm 13 is cooled to room temperature and thermal contacts 28a, 28b reclose during the period within which the crucible temperature rises to somewhat above and then falls to the preselected control value. The bridge network is again unbalanced when the crucible temperature drops below the selected control value, since the resistive bridge arms 13, 14 are then of equal value but the photocell arm 12 has a lesser resistance than the photocell arm 11 due to unequal distribution of the reflected light beam upon the photocells.

The further operation of the control system takes place in the following manner to provide a proportioning control of the resetting type. Tube 1 is rendered conductive by the unbalance of the bridge network, and relay 19 pulls in to close the circuits of operating coil 10 of the power switch 9, and also the circuits of heaters 24, 25 of the bridge arms and of heater 26 of the thermal switch. The thermal switch no longer affects the proportioning control since its thermal capacity is so great that it requires substantially continuous heating for a long period to open the circuit of heater 25 of the resetting system. The heat input to the crucible continues until the bridge network is rebalanced by the increased resistance of bridge arm 13 due to heat transfer from the heating resistor 24. The rebalancing is delayed somewhat by the simultaneous heating of the resetting bridge arm 14 by heater 25 but, for simplicity of explanation, the control action will be first described on the assumption that the heater 25 is omitted. The tube output current again falls below normal at the rebalance of the bridge network through the increased resistance of bridge arm 13, and the current inputs to the crucible heating winding 8 and to the rebalancing heater 24 are interrupted by the opening of contacts 20, 21 of relay 19. The heat inertia of the heater 24—resistance 13 combination is less than that of the crucible, and the rebalance is therefore effected before the crucible temperature rises to the preselected control value. Heater 24 and resistance 13 cool down at a relatively rapid rate until the resultant decrease in the effective value of resistance 13 again unbalances the bridge network, and the described cycle of operations is repeated.

The power input to the crucible is governed by the same relay 19 which regulates the current input to the heaters 24, 25 of the control network, and the power input pulses and control current pulses are therefore identically modulated. The extent and the sense of the unbalance of the bridge network by a differential illumination of the photocells 11, 12 depends directly upon the magnitude and sense of the departure of the measured temperature from the desired control value, and the time interval for the heating or cooling of the bridge arm 13 to rebalance the network therefore varies with the departure of the crucible temperature from the preselected control value. The regulated power input by current pulses, as averaged over a cycle or number of cycles, is thus proportional to the average power input demand.

If the "resetting" heater 25 is omitted, as above assumed, the rebalance of the power input to a changed power demand may take place at any temperature within the control range which includes, and extends above and below, the preselected control temperature. The function of the "resetting" heater 25 is to insure a balance of the power input and power demand at the preselected control temperature. An increase in the effective value of the bridge resistance 14 operates in the same sense as a decrease in the resistance of the photocell 12 to unbalance the bridge network to increase the plate current of the tube 1, i. e. to supply power to the crucible heating winding 8. The heat inertia or thermal lag of heater 25 and bridge arm 14 is greater than the heat inertia or thermal lag of heater 24 and bridge arm 13, and the above-described rebalance of the bridge network by the heating of bridge arm 13 takes place in spite of the simultaneous heating, but at a slower rate, of bridge arm 14. The ultimate resistance of bridge arm 14 after a plurality of cyclic heatings introduces a bridge unbalance equal to and in the same sense as the initial unbalance due to the departure of the measured temperature from the preselected control value, whereby the rebalance action developed by an increase in the effective value of bridge arm 13 must be double the rebalance action required to counteract the initial unbalance. This doubling of the rebalance action results in a final balance of the power input and power demand at the preselected control temperature value.

By transforming the effective control factors into equivalent thermal values, any desired degree of inertia and type of response is made available for use in the control circuit. An almost unlimited choice of heat input, heat transfer and heat storage characteristics permits design of the control circuit to obtain a response measurable in split seconds or in hours according to the particular process or apparatus to be controlled. Simplification of circuit arrangements and of mechanical constructions, improved stability and other advantages are thus characteristic of the invention. The effects of ambient temperature changes on the heat-responsive bridge arms 13, 14 cancel out and do not affect the ultimate accuracy of the control circuit.

The Fig. 1 control circuit is to be understood as illustrative of an application of the invention to the frequently encountered problem of the regulation of current to an electrical heater to maintain a substantially constant temperature.

The photocell type of resistance in two arms of the bridge network necessitates relatively high resistances for the other bridge arms, but the invention is not limited to high resistance circuits or to the illustrated arrangement of the photocells since transformer couplings to obtain an impedance match with temperature-variant bridge arms are possible, or a resistor bulb and a fixed resistor could be substituted for the photocells. A control factor other than temperature may be employed to vary the relative illumination of the photocell or photocells of the control network, and amplifiers may be introduced between the tube 1 and the control relay 19 if necessary or desirable.

Figure 2:
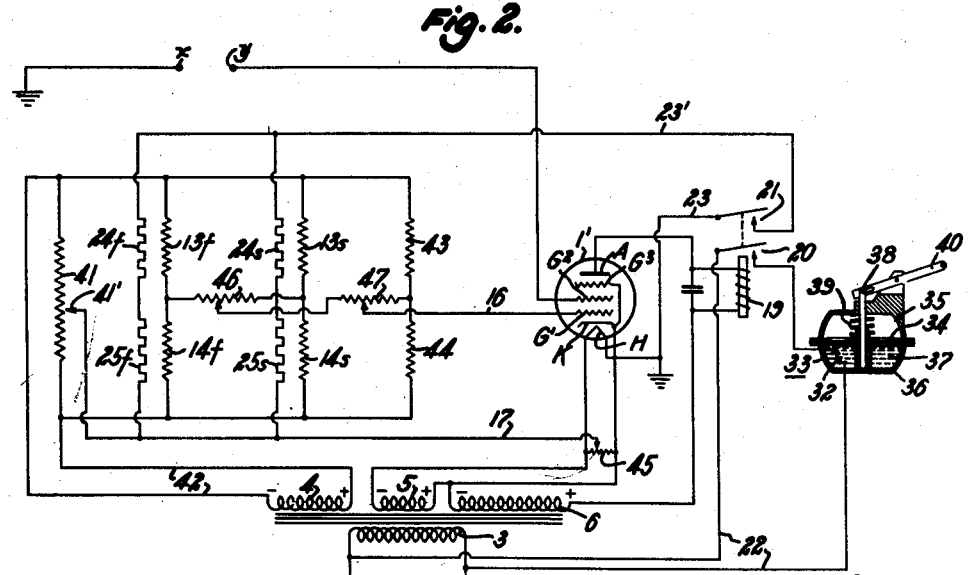
Fig. 2 is a circuit diagram of another embodiment in which the modulated current pulses are integrated to determine the adjustment of a control element.

A more elaborate embodiment of the invention which includes means for manually adjusting the rate of rebalancing and/or resetting of the control system is illustrated in Fig. 2. The elements which are or may be substantially identical with elements of the Fig. 1 circuit are identified by the corresponding reference numerals but will not be individually described. The electronic tube 1' of the control network is of the pentode type with a control grid $G^1$ upon which an initial negative bias is imposed through a temperature variant control network, and a second grid $G^2$ which is returned to ground and the cathode K through a circuit having terminals $x$, $y$ across which a control factor sets up a positive voltage to establish conduction through the tube under preselected conditions. The suppressor grid $G^3$ is connected to cathode K and to the grounded side of the cathode heater H in conventional manner. The relay 19 in the plate circuit has contacts 20 for closing the circuit of a heater resistor 32 of a regulating device comprising a casing 33 having a diaphragm 34 dividing the casing into an air chamber 35 and a closed chamber 36 containing liquid 37 in which the heating resistor 32 is immersed. A rod 38 is secured to the diaphragm and is surrounded by a spring 39 which forces the diaphragm 34 downwardly upon the liquid in the closed chamber 36. The rod 38 is connected to and actuates a lever 40 which is pivotally supported on the casing 33 and connected to a progressively adjustable regulating device and/or to the pointer of a measuring instrument, not shown.

The network for impressing a bias voltage upon the grid $G^1$ takes the form of a complex Wheatstone bridge which includes a potentiometer 41 connected across the secondary winding 4 of the power transformer by leads 42, and a plurality of voltage dividers connected in parallel across the potentiometer 41; the individual voltage dividers comprising, in series, resistors 13$f$ and 14$f$, resistors 13$s$ and 14$s$, and resistors 43 and 44. All of these resistors are preferably of the same magnitude when at the same temperature. Heating resistors 24$f$, 25$f$ and 24$s$, 25$s$ are in heat transfer relation to the serially arranged temperature-variant resistors 13$f$, 14$f$ and 13$s$, 14$s$, respectively, and these assemblies are so designed and constructed that, at heat saturation, the resistors 13$f$, 14$f$, 13$s$ and 14$s$ have the same temperature and same resistance value. The circuits of the heaters are connected across the secondary winding 5 of the power transformer, and controlled by contacts 21 of the relay 19, as previously described with respect to the Fig. 1 circuit.

The adjustable tap 41' of potentiometer 41 is connected by a lead 17 to the sliding tap of a resistor 45 which is connected across the secondary winding 5 of the power transformer, and the cathode-grid circuit is completed through the resistance network by a potentiometer 46 connected between the mid-points of voltage dividers 13f, 14f and 13s, 14s; a second potentiometer 47 connected between the tap of potentiometer 46 and the junction of resistors 43, 44, and lead 16 from the tap of the second potentiometer to the grid $G^1$. When the tap 41' of potentiometer 41 is at mid-point, and the tap of potentiometer 47 is adjusted to connect the grid lead 16 to the junction of the resistors 43, 44, the grid bias is determined by the position of the tap on resistor 45 which is shunted across the cathode heater.

With the instantaneous polarity of secondary windings 4, 5 and 6 as indicated on the drawing for half-cycles during which the plate potential is positive, the temperature-variant resistors 13f, 13s are "rebalancing" elements and resistors 14f, 14s are "resetting" elements of the control network. In each voltage divider, the rebalancing element 13f or 13s has a lower heat inertia than its associated resetting element 14f or 14s; and the heat inertias of 13f and 14f are less than the heat inertias of 13s and 14s, respectively. In other words, the voltage divider 13f, 14f changes in resistance more rapidly than the voltage divider 13s, 14s when heated or cooled for the same period, but the ultimate resistance values of all sections of the voltage dividers are equal at heat saturation and after prolonged cooling.

The basic method of operation of the control network of Fig. 2 is the same as that of the Fig. 1 circuit. A departure of the control factor from its preselected value, and in the sense which necessitates a clockwise adjustment of lever 40 to rebalance the operating conditions develops a voltage across terminals $x$, $y$ which biases grid $G^2$ to establish conduction and energize relay 19. This results in a current input to resistance 32 of the integrating regulator, and in current inputs to the heaters 24f, 25f and 24s, 25s to alter the absolute and the relative values of temperature-variant resistors of the control network. The effective heat inertias or time constants of the control elements may be varied by adjusting the tap of potentiometer 46 from the end adjacent the fast-acting voltage divider 13f, 14f to the end adjacent the slow-acting voltage divider 13s, 14s, and the sensitivity of the control resulting from voltage changes developed at the selected time constant may be varied by adjustment of the tap connection of lead 16 to potentiometer 47, thereby determining the range of control. Adjustment of the tap 41' of potentiometer 41 permits a setting of the initial bias on grid $G^1$ to the sense and magnitude which establish a "normal" plate current approximately equal to one-half the maximum plate current when the voltage across terminals $x$, $y$ corresponds to the preselected value of the control factor.

The control factor may develop a direct current voltage across the terminals $x$, $y$, or may develop an alternating current voltage of a frequency up to high and ultra-high radio frequency signals in the case of, for example, a guided missile or rocket which is controlled by modulated radio frequency signals transmitted from an airplane or a home base. In place of a single tube with two control grids, two tubes with a plate circuit in common may be employed in the Fig. 2 control system.

The invention may be employed to advantage to derive a pulse modulation control from, and/or to add a resetting action to, conventional modulating control systems. In the Fig. 3 control system, a pair of resistive or inductive impedances Z1, Z2 are adjustable in opposite sense by changes in the magnitude of the control factor as measured by any appropriate device 48 which may be, as indicated by the legend, a conventional modulating control. A tube 1 and the associated power transformer for energizing the same are substantially identical with corresponding elements of Fig. 1, and the component parts are identified by the same reference numerals but will not be described in detail. The control network includes a potentiometer 41 connected across the secondary winding 4 of the power transformer, and a plurality of temperature-variant voltage dividers shunted across the potentiometer 41. The general arrangement of the network is similar to that illustrated in Fig. 2, but the voltage divider elements and associated heaters are identified by a new set of reference numerals since the functions of some of the voltage divider elements differ from those of correspondingly arranged elements of the Fig. 2 assembly of temperature-variant voltage dividers. A pair of voltage dividers comprising, in series, resistors 49f, 50f and resistors 49s, 50s are shunted across potentiometer 41, the voltage divider 49f, 50f having a lower heat inertia than the voltage divider 49s, 50s. A third voltage divider comprises resistors 51 and 52 in series, the resistor 51 being connected to the terminal of potentiometer 41 which is at a negative potential during half-cycles when the plate potential of tube 1 is positive.

A heater 53 is in heat transfer relation to the resistor 52, which functions as the resetting element of the control system, and the heater 53 is connected across the cathode heater H through the contacts 21 of the plate circuit relay 19. The resistor 51 is not provided with a heater and therefore is of constant value except for variations with ambient temperature. Heaters 54f, 55f and 54s, 55s are in heat transfer relation to voltage divider resistors 49f, 50f and 49s, 50s, respectively. All of the voltage divider resistors are preferably of the same value at any given temperature. A potentiometer 56 is connected between the midpoints of the voltage dividers 49f, 50f and 49s, 50s, and the tap of the potentiometer is connected to the junction of resistors 51, 52 through a second potentiometer 57, the tap of the second potentiometer being connected to grid G of tube 1 by a lead 58.

Leads 23, 23' connect the grounded, positive terminal of the heater H to the junction of the control impedances Z1, Z2, and leads 59, 60 connect the other terminals of impedances Z1, Z2 to the tap 41' on potentiometer 41 and to the cathode K, respectively. Heaters 54f, 54s for resistors 49f, 49s are connected, in parallel with each other, between lead 59 from impedance Z1 and a lead 61 to the negative side of the cathode heater H. Similarly, heaters 55f, 55s for resistors 50f, 50s are connected, in parallel with each other, between lead 60 from impedance Z2 and the common lead 61 to heater H. Inspection of the described circuit arrangement shows that a Wheatstone bridge is formed by impedances Z1, Z2, heaters 54f, 54s in parallel, and heaters 55f, 55s in parallel; and that this bridge is energized by the voltage drop across the heater H, i. e. leads 23, 23' connect the junction of the impedances Z1, Z2 to the positive side of the heater H, and lead 61 connects the opposite junction of the bridge to the negative side of the heater H. The other pair of opposite junctions of the bridge are connected, respectively, to cathode K by lead 60, and to grid G by lead 58 and the control network. This bridge network, when balanced, establishes the same potential on the grid G and cathode K, but it is of course preferable to provide an initial grid bias of such negative value as to develop about one-half the maximum plate current in tube 1 when the control factor has its preselected value. The initial bias could be developed by a preliminary unbalance of the Wheatstone bridge, but it is preferable to develop the blocking bias by shifting the tap 41' of potentiometer 41 from midpoint towards the terminal which is positive when the plate potential is positive. This adjustment makes the cathode K positive with respect to the grid G which is connected to the midpoint of the voltage divider network by lead 58.

With the system in operation, and assuming that the control factor has held its preselected value for a sufficient interval to permit the several heaters to cool to room temperature, the input Wheatstone bridge containing impedances Z1, Z2 is balanced, the complex Wheatstone bridge of the voltage divider system is balanced, and relay 19 is open at the plate current value determined by the negative bias resulting from the off-center adjustment of the tap 41' of potentiometer 41. A change in the measured value of the control factor in that sense which calls for a power input results in action by the device 48 to decrease the value of impedance Z1 and simultaneously to increase the value of impedance Z2. The Wheatstone bridge is thus unbalanced, and the immediate effects of the unbalance are to develop a less negative grid bias potential across the bridge, to increase the current to heaters 54f, 54s and to decrease the current to heaters 55f, 55s. A preselected degree of bridge unbalance results in an increase in plate current to the value at which relay 19 pulls in to close the load circuit contacts 20 and also the contacts 21 of the circuit of heater 53 associated with the resetting resistor 52. Voltage divider resistors 49f and 49s are heated more intensely by the increased current to their heaters 54f and 54s, whereas resistors 50f and 50s cool as the current to their heaters 55f and 55s is reduced. The corresponding changes in the resistance values of these resistors reduce the positive potential of the junction of resistors 49f, 50f at a relatively rapid rate, and reduce the positive potential of the junction of resistors 49s, 50s at a slower rate. Heater 53 receives current, since the relay contacts 21 are closed, and the resultant heating of resistor 52 increases the positive potential at the junction of resistors 51, 52, but at a still slower rate. The grid bias is shifted progressively in a negative sense by this differential heating of the resistive voltage dividers until the decreasing plate current is insufficient to hold in the relay 19. The relay contacts 20, 21 open to interrupt the power supply to the controlled circuit, and to interrupt the heating current to heater 53 of the rebalancing resistor 52. This cycle is repeated when the measured value of the control factor drifts from its preselected value after the opening of the power supply at relay contacts 20, and the cyclic heating of the resetting resistor 52 operates after a time delay to reduce the positive potential at the junction of voltage divider resistors 51, 52, thereby introducing an unbalancing action which supplements the unbalance of the control system as initiated by the adjustment of impedance Z1 to a lower value than that of impedance Z2. The rebalancing resistors 49f, 50f and 49s, 50s must be heated for longer periods than would be required to compensate only for the unbalance of the impedances Z1, Z2, due to time-delayed unbalance introduced by resistor 52, and the eventual rebalance of the control system is effected at the average power input which restores the control factor to its preselected value at which the control device 48 adjusts impedances Z1, Z2 to equality.

The method of operation of the temperature-sensitive resistance network of Fig. 3 is generally similar to that of the resistive network of Fig. 2, but differs therefrom in that the rebalancing resistors are continuously heated and only the resetting resistor 52 is heated by current pulses to the heater 53. In the Fig. 3 circuit, the adjustment of the taps of potentiometers 56, 57 regulates the time rate and degree of the resetting action of resistor 52.

The electronic tubes of the circuits so far described operate as amplifiers, but the current pulse method is also applicable to control systems in which the tube functions as an oscillator. The control system illustrated in Fig. 9 of Patent No. 2,434,941 is of the oscillator type, and a further oscillator system is illustrated in Fig. 4. The particular apparatus of Fig. 4 affords a "wired radio" control of an oil burner of a home heating plant, but there are other applications in which the control factor is not temperature and in which the relay is directly included in the control system and not coupled thereto by a carrier wave link circuit.

The illustrated oscillator system includes a pentode 62 energized from a conventional power line L by a transformer having a primary winding 3', a low voltage secondary winding 5' across which the heater H is connected, and a high voltage secondary 6' which is connected between ground and the screen grid $G^2$ through the "plate" coil 63. The grid coil 64 is connected between grid $G^1$ and the tap of of a potentiometer 45' shunted across the heater winding 5'. Anode A is connected to the primary winding 3' by a condenser 65, and is connected to ground through a radio frequency choke 66, the winding of a relay 67 having contacts 68, and a blocking condenser 69.

The grid and plate coils are coupled by a link circuit including coils 70, 71 of a few turns each inductively coupled to grid coil 64 and plate coil 63, respectively. The lead 72 which connects coils 70, 71 is grounded on an electrostatic shield 73 which extends between the coupling coils and the oscillator coils, and the electrostatic shield is grounded through lead 74. The link circuit includes a coil 75 in series with the coupling coils 70, 71; and a coil 76 shunted across the coupling coil 70. The primary temperature-variant control circuit is, in series, a coil 77 coupled to coil 76 and an impedance 78 which is adjusted as to effective value by a thermostatic element 79. The temperature responsive circuit is grounded by a connection 80 to the grounded lead 74.

The rebalancing and resetting circuits of the control system include coils 81, 82 coupled to coils 75 and 76 respectively, and grounded through temperature-variant resistors 83, 84 respectively. Heaters 85, 86 for resistors 83, 84 respectively are in series in a circuit across the heater 8; the series circuit comprising lead 87 from the negative side of cathode heater H to the blade element of the relay contacts 68, the stationary contact element, a lead 88 to the heaters, and the ground connections to the positive potential side of the heater H.

The power transformer which energizes the control system may be permanently wired to the line L but preferably the leads to the transformer terminate in a conventional plug connector 89 which may be inserted in any of the sockets 90 of the house circuits, thereby permitting a transfer of the control apparatus from one room to another. This is of considerable advantage over the present method of controlling the heating furnace according to the temperature at a preselected and fixed point within one room of the house. The temperature within that room can be held at a substantially constant level, but the temperatures in other rooms will vary considerably with changing wind and weather conditions, and also with local heating from fireplaces and electric heaters. The "plug-in" control apparatus permits a location of the control point of the system in the particular room which affords a temperature distribution throughout the house which best satisfies the operating conditions at the time.

The controlled element of the Fig. 4 circuit is a burner 91 which is connected across the line L by contacts 92 of a relay 93 when the latter is energized by a radio frequency amplifier and detector 94. The signal input to the amplifier detector 94 is from line L through condensers 95, and the power supply to the amplifier-detector is from line L through a conventional plug-in connection 96. Choke coils 97 are preferably included in the line L between the burner and the radio frequency connections to the amplifier-detector unit 94, and also between the line L and the power source S.

The tube 62 is so biased by adjustment of the tap of potentiometer 45' that oscillation accompanied by an increase in plate current occurs at a predetermined degree of coupling of coils 63 and 64 through the link circuit. The coil 76 is in parallel with the link circuit, and an increase in its effective impedance will increase the degree of coupling and the tendency toward oscillation, whereas coil 75 is in series in the link circuit and an increase in its effective impedance will decrease the degree of coupling and the tendency towards oscillation. The input or primary control impedance 78 is progressively adjusted to lower values by the thermostatic element 79 as the room temperature rises, and the load imposed upon coil 76 by the primary control circuit, comprising impedance 78 in series with coil 77, therefore increases as the room temperature rises. The resetting coil 82 is also coupled to coil 76, and the load imposed on coil 76 by coil 82 decreases as its serially connected resistor 84 is heated and increases in value. The effective impedance of the link-shunting coil 76 is therefore increased, with a corresponding decrease in the degree of link circuit coupling and tendency towards oscillation, when the resetting resistor 84 is heated by current through the heater 86. On the contrary, the heating of resistor 85 decreases the load imposed on coil 75 by rebalancing coil 81 and increases the degree of link circuit coupling and the tendency towards oscillation since the coil 75 is in series with the link circuit.

The tube 62 is normally biased to develop about one-half the maximum plate current when the room temperature is at the preselected value, and the rebalancing and resetting resistors 83, 84 respectively are at the same temperature and have identical resistance values. The relay 93 is de-energized and the power switch 92 of the burner is open since there is no carrier wave input to the amplifier-detector 94.

A drop in the room temperature results in an increase in the value of impedance 78, thereby increasing the link circuit coupling, and the tube 62 oscillates when the preselected degree of coupling is reached. Carrier wave energy is transmitted to the amplifier-detector unit 94, and relay 93 is energized to close the contacts 92, thereby starting operation of the burner 91. The plate circuit relay 67 also pulls in to close switch 68 and connect the heaters 85, 86 across the secondary winding 5' of the power transformer. The heat transfer to resistor 83 increases its effective value, thereby decreasing the load imposed on coil 75 by the rebalancing coil 81, and the degree of coupling is thereby reduced until oscillation is blocked by the fixed bias from potentiometer 45'. The resetting resistor 84 is simultaneously increased in effective value by heat transfer from heater 86, but the thermal inertia of resetting resistor 84 is substantially greater than the thermal inertia of the rebalancing resistor 83. The resistors 83, 84 start to cool as soon as the tube 62 is blocked, but the room temperature does not drop immediately, and may in fact continue to rise for some time due to the heat energy stored in the radiators in the case of hot water heating systems or to a further transfer of heat to the radiators in the case of a vacuum heating system. Eventually, however, another cycle of operation is initiated when the degree of coupling of the oscillator coils 63, 64 by the link circuit rises to its preselected value and, after a few cycles, a balance is reached between the average heat input and the heat demand to maintain the room temperature at the desired level.

It is to be noted that the plate circuit relay 67 can be omitted by designing the oscillator to jump into and to drop out of a state of oscillation, and locating the heaters 85, 86 in the plate or screen grid circuits.

The entire power supply to the controlled device is subjected to an on-off control in the apparatus as illustrated in Figs. 1, 3 and 4, but it is to be understood that there may be a continuous supply of power to the controlled device at a level sufficient to meet the minimum power demand, and that the control will then be imposed only upon a complementary power supply of a magnitude sufficient to increase the total power input to or above the anticipated maximum value.

The illustrated circuits indicate the wide latitude in the design and construction of apparatus operating in accordance with the invention, and it is to be understood that other circuit arrangements which may occur to those familiar with the art fall within the spirit and scope of the invention as set forth in the following claims.

I claim:

1. An electronic measuring or control apparatus for equipment to which a medium is to be supplied to maintain a control factor at a preselected value, said apparatus being of the type including an electronic tube having a control grid cooperating with a cathode and an anode, energizing means to energize said electronic tube, said energizing means including a first current source for developing a grid bias voltage and a second current source for developing a cathode-heating current, an input circuit network for said tube including a bridge network having one set of conjugate terminals connected across said first current source and a second set of conjugate terminals connected respectively to said control grid and to said second current source, means for imposing upon said input circuit network a control voltage varying with the value of said control factor, thereby to alter the current output of the tube, an output circuit for said tube having therein current-responsive means effecting a cyclic on-off control of the supply of said medium effecting the magnitude of said control factor, and means for converting said on-off control to a proportioning control varying with the magnitude of the instantaneous departure of the value of said control factor from the preselected value; characterized by the fact that said last-mentioned means comprises means developing a secondary control voltage in said bridge network to impose on said control grid a bias voltage varying in magnitude with the integrated time durations of those portions of the on-off cycles during which the medium is supplied to the equipment.

2. An electronic measuring or control apparatus as recited in claim 1, wherein both said control voltage and said secondary control voltage are impressed upon said control grid.

3. An electronic measuring or control apparatus as recited in claim 1 wherein said electronic tube includes a second grid, and said input circuit includes a circuit connected to said second grid and included in said means for imposing said factor-varying control voltage on said input network.

4. An electronic measuring or control apparatus as recited in claim 1, wherein said input circuit network is non-resonant and said electronic tube operates as an amplifier.

5. An electronic measuring or control apparatus as recited in claim 1, wherein said means for developing a secondary control voltage includes a temperature-variant impedance constituting a side arm of said bridge network, a heater resistor for said impedance, and a circuit for said heater resistor including a current source that is cyclically closed and opened by said current-responsive means in synchronism with the cyclic on-off control of the supply of said medium.

6. An electronic measuring or control apparatus as recited in claim 5, wherein said current source of the heater resistor is said second current source.

7. An electronic measuring or control apparatus as recited in claim 5, wherein the said current-responsive means is a relay having one set of contacts controlling the supply of said medium, and a second set of contacts in the circuit of said heating resistor.

8. In an electronic control apparatus for regulating the supply of a medium to equipment for maintaining a control factor at substantially a preselected value; an electronic tube having a grid cooperating with a cathode and an anode, energizing means to energize said tube, said energizing means including a first current source for developing a bias voltage and a second current source for developing a cathode-heating current, an input circuit network between said grid and cathode, said network including impedance forming a Wheatstone bridge, an output circuit connected between the anode and cathode, said output circuit having therein a relay with contacts imposing an on-off control upon the supply of the medium to said equipment, means including said first current source for imposing upon said grid through said Wheatstone bridge a preliminary bias developing a normal output current, said normal output current being less than the pull-in and more than the drop-out current values of said relay, means continuously responsive to an instantaneous departure of said control factor from preselected value and in the sense resulting from an inadequate supply of the medium to increase the tube output current to above the pull-in current value of said relay, thereby to establish a further supply of the medium, and time-delayed means energized by a pull-in of said relay to alter the balance condition of said Wheatstone bridge to reduce the tube output current below the drop-out current value of the relay, thereby to interrupt the supply of said medium to the equipment.

9. In an electronic control apparatus, the invention as recited in claim 8, wherein the arms of said Wheatstone bridge include two phototubes and two temperature-variant impedances, said means to increase the tube output current includes means responsive to the changing magnitude of the control factor for regulating the relative illumination of said phototubes, and said time-delayed means includes heater resistors in heat-transfer relation to said temperature-variant impedances, said heater resistors being in series circuit with said second source of current and contacts of said relay.

10. In an electronic control apparatus, the invention as recited in claim 9, wherein the heating of one temperature-variant impedance varies the bridge balance in that sense which tends to decrease the tube output current while the heating of the second-temperature-variant impedance tends to increase the tube output current, the heat inertia of the first temperature-variant impedance and its associated heater resistor being less than that of the second temperature-variant impedance and its associated resistor; whereby the first temperature-variant impedance functions to rebalance the input circuit network to de-energize the relay at a value of the control factor other than said preselected control factor value, and the second temperature-variant impedance functions to reset the input circuit network at balance at the preselected value of the control factor.

11. In an electronic control apparatus, the invention as recited in claim 8, wherein said tube includes a second grid, and said means for increasing the tube output current includes a grid-biasing circuit between the cathode and said second grid.

12. In an electronic control apparatus, the invention as recited in claim 8, wherein a plurality of the arms of said Wheatstone bridge are temperature-variant impedances; and said time-delayed means includes heater resistors in heat-transfer relation to said temperature-variant impedances, and heating circuits for said resistors controlled by said relay; one temperature-variant impedance being a rebalancing impedance operating on heating thereof to reduce the tube output current and a second temperature-variant impedance being a resetting impedance operating on heating thereof to increase the tube output current; said resetting impedance having a greater heat inertia than said rebalancing impedance; in combination with means energized by said relay when pulled-in for an interval in excess of that required for said resetting impedance to reach its saturation temperature to open the heating circuit of the heater resistor in heat transfer relation to said resetting impedance.

13. In an electronic control apparatus, the invention as recited in claim 12, wherein said relay-energized means is a thermal switch having a heating circuit controlled by said relay.

14. In an electronic control apparatus, the invention as recited in claim 8, wherein said Wheatstone bridge is complex and comprises a potentiometer across which said first current source is connected as an element of said means for imposing a preliminary bias on the tube grid, the terminals of said potentiometer constituting an opposite pair of junctions of said Wheatstone bridge, a plurality of resistive voltage dividers connected in parallel across said potentiometer, the respective sections of two of said voltage dividers being temperature-variant resistances; one section of a third voltage divider being a fixed resistance, means connecting the junction of the sections of said third voltage divider to said tube grid, resistance means connecting the junctions of the respective sections of said voltage dividers; and said time-delay means comprises heater resistors in heat transfer relation to said temperature-variant resistances, and heating circuits for said heater resistors including said second current source and contacts of said relay; the heat inertias of the temperature-variant resistances of two voltage dividers being different.

15. In an electronic control apparatus, the invention as recited in claim 14, wherein said resistance means includes a potentiometer connected between the junctions of the sections of said voltage dividers of different heat inertias, and a resistor connected between the junction of the sections of said third voltage divider and the tap of said last-mentioned potentiometer whereby the time-rate of change in the balance condition of the Wheatstone bridge varies with the adjustment of the tap of said last-mentioned potentiometer.

16. In an electronic control apparatus, the invention as recited in claim 14, wherein said resistance means includes a first potentiometer connected between the junctions of the sections of said voltage dividers of different heat inertias, a second potentiometer having ends connected between the junction of the sections of said third voltage divider and the tap of said first potentiometer whereby the time-rate of change in the balance condition of the Wheatstone bridge varies with the adjustment of the tap of said first potentiometer, said second potentiometer having a tap included in said means connecting the junction of the section of said third voltage divider to the tube grid whereby adjustment of the tap of said second potentiometer renders the grid bias independent of the relative resistance values of the respective sections of said voltage dividers having temperature-variant resistances.

17. In an electronic control apparatus, the invention as recited in claim 14, wherein said input circuit network includes a second Wheatstone bridge having a conjugate pair of terminals connected to the second pair of opposite junctions of said first Wheatstone bridge, the other conjugate pair of terminals of said second Wheatstone bridge being connected across said first current source; said second Wheatstone bridge having two bridge arms comprising impedances adjustable in opposite sense by variations in the instantaneous value of the control factor, and two arms of said second Wheatstone bridge comprising, in parallel, the heater resistors for said temperature-variant resistances constituting sections of two voltage dividers having different heat inertias.

18. In an electronic control apparatus, the invention as recited in claim 14 wherein the second section of said third voltage divider is a temperature-variant resistance, and said time-delay means includes a heating circuit for said last-mentioned temperature-variant resistance and controlled by said relay.

GEORGE A. F. MACHLET.

References Cited in the file of this patent

UNITED STATES PATENTS

| Number | Name | Date |
|---|---|---|
| 1,497,194 | Norden | June 10, 1924 |
| 1,822,075 | Aronoff | Sept. 8, 1931 |
| 2,154,375 | Chambers | Apr. 11, 1939 |
| 2,235,169 | Roberts | Mar. 18, 1941 |
| 2,263,298 | Haimbaugh | Nov. 18, 1941 |
| 2,276,506 | Moore | Mar. 17, 1942 |
| 2,278,633 | Bagnall | Apr. 7, 1942 |
| 2,290,091 | Brown | July 14, 1942 |
| 2,299,330 | Macnabb | Oct. 20, 1942 |
| 2,300,537 | Davis | Nov. 3, 1942 |
| 2,325,232 | Davis | July 27, 1943 |
| 2,325,308 | Davis | July 27, 1943 |
| 2,423,534 | Upton | July 8, 1947 |
| 2,477,835 | Smith | Aug. 2, 1949 |
| 2,496,860 | Davis | Feb. 7, 1950 |